US011437850B2

(12) United States Patent
Quigley et al.

(10) Patent No.: US 11,437,850 B2
(45) Date of Patent: Sep. 6, 2022

(54) WIRELESSLY ELECTRICALLY-COUPLED DEPLOYABLE APPARATUS

(71) Applicant: Lippert Components, Inc., Mishawaka, IN (US)

(72) Inventors: Patrick Quigley, South Bend, IN (US); Vishwatej Mane, South Bend, IN (US); Brian Carlson, South Bend, IN (US); Evan Whitney, Edwardsburg, MI (US); Nathaniel Fuller, Granger, IN (US); Scott McKinnon, Union City, MI (US)

(73) Assignee: Lippert Components Inc., Elkhart, IN (US)

( * ) Notice: Subject to any disclaimer, the term of this patent is extended or adjusted under 35 U.S.C. 154(b) by 375 days.

(21) Appl. No.: 16/794,290

(22) Filed: Feb. 19, 2020

(65) Prior Publication Data

US 2020/0274391 A1    Aug. 27, 2020

Related U.S. Application Data

(60) Provisional application No. 62/808,541, filed on Feb. 21, 2019.

(51) Int. Cl.
*H02J 50/10* (2016.01)
*B60P 3/36* (2006.01)
(Continued)

(52) U.S. Cl.
CPC ............... *H02J 50/10* (2016.02); *B60P 3/36* (2013.01); *B60R 3/02* (2013.01); *F21V 23/06* (2013.01)

(58) Field of Classification Search
CPC .......... H02J 50/10; H02J 50/12; H02J 50/005; B60P 3/36; B60R 3/02; B60R 3/00;
(Continued)

(56) References Cited

U.S. PATENT DOCUMENTS

| 4,027,807 A | 6/1977 | Thorley |
| 5,280,934 A * | 1/1994 | Monte ...................... B60R 3/02 |
| | | 182/127 |

(Continued)

FOREIGN PATENT DOCUMENTS

| WO | 2017136902 A1 | 8/2017 |
| WO | 2019053618 A1 | 3/2019 |

OTHER PUBLICATIONS

European Search Report for EP Pat. App. No. 20 15 8841, completed on Apr. 24, 2020. 7 pages.

*Primary Examiner* — Bao Q Truong
(74) *Attorney, Agent, or Firm* — Mechanicus PLLC (57) ABSTRACT

A wirelessly electrically-coupled deployable apparatus comprising a deployable structure supported on a supporting structure for motion between a stowed position and a deployed position, an electrically-powered device carried by the deployable structure, a wireless electrical power receiving circuit carried by the deployable structure and connected between the device and a wireless electrical power receiver, and a wireless electrical power transmitting circuit carried by the supporting structure and connected between an electrical power supply and a wireless electrical power transmitter. The wireless electrical power transmitter is carried by the supporting structure, and the wireless electrical power receiver is carried by the deployable structure, in respective positions where wireless electrical power transfer between the wireless electrical power transmitter and receiver powers the device via the receiving circuit when the deployable structure is in its deployed position.

11 Claims, 7 Drawing Sheets

(51) Int. Cl.
*B60R 3/02* (2006.01)
*F21V 23/06* (2006.01)

(58) Field of Classification Search
CPC ......... B60R 3/007; B60R 3/005; F21V 23/06; F21V 33/00; E06C 5/04; E06C 9/08
See application file for complete search history.

(56) References Cited

U.S. PATENT DOCUMENTS

| | | |
|---|---|---|
| 8,278,784 B2 | 10/2012 | Cook et al. |
| 10,144,345 B2 * | 12/2018 | Stinson .................. F21V 23/06 |
| 2008/0163571 A1 | 7/2008 | Kohler |
| 2018/0141484 A1 | 5/2018 | Heneda et al. |
| 2018/0141486 A1 * | 5/2018 | Stinson .................. H02J 7/025 |

* cited by examiner

WIRELESSLY ELECTRICALLY-COUPLED DEPLOYABLE APPARATUS

CROSS-REFERENCE TO RELATED PATENT APPLICATIONS

This is a U.S. non-provisional patent application claiming the benefit of priority from U.S. provisional patent application No. 62/808,541 filed on Feb. 21, 2019, the entire contents of which are incorporated herein.

STATEMENT REGARDING FEDERALLY SPONSORED RESEARCH OR DEVELOPMENT

Not Applicable

BACKGROUND

Field

This application relates generally to wireless electrical power transfer from a supporting structure to a deployable structure that is movable between stowed and deployed positions.

Description of Related Art Including Information Disclosed Under 37 CFR 1.97 and 1.98

Electrical components, such as lamps or electronics may be carried by deployable structures, such as truck tailgates, that are movably mounted relative to structures carrying electrical power sources for such components. Under these circumstances, wires routed between a power source and an electrical component are vulnerable to damage and wear as the deployable structure is repeatedly moved relative to its power source. As a result, wireless power transfer technology is sometimes used to power electrical components carried by deployable structures, reducing the problems of wear on flexing wires, but introducing new limitations such as the extremely limited range of current practical wireless power transfer systems. Due to this limitation, known wirelessly-powered appliances, especially in the automotive and recreational vehicle industries, are limited to transferring power only when a deployable or movable structure is in a closed or retracted position, and cutting off any power transfer from a main power supply when the deployable structure is deployed.

SUMMARY

A wirelessly electrically-coupled deployable apparatus is provided for wireless transfer of electrical power from a supporting structure to a deployable structure when the deployable structure is in a deployed position. The device includes a deployable structure supported on a supporting structure for motion between a stowed position and a deployed position and an electrically-powered device carried by the deployable structure. A wireless electrical power receiving circuit is carried by the deployable structure and is connected between the device and a wireless electrical power receiver. A wireless electrical power transmitting circuit is carried by the supporting structure and is connected between an electrical power supply and a wireless electrical power transmitter. The wireless electrical power transmitter is carried by the supporting structure and the wireless electrical power receiver is carried by the deployable structure in respective positions where wireless electrical power transfer between the wireless electrical power transmitter and receiver will power the device via the receiving circuit when the deployable structure is in its deployed position.

DETAILED DESCRIPTION

A first embodiment of a wirelessly electrically-coupled deployable apparatus is generally shown at 10 in FIGS. 1-4 and 9. A second embodiment of the apparatus is generally shown at 10' in FIG. 5. A third embodiment is generally shown at 10" in FIGS. 6-8. Reference numerals with the designation prime (') in FIG. 5, and double prime (") in FIGS. 6-8; indicate alternative configurations of elements that also appear in the first embodiment. Unless indicated otherwise, where a portion of the following description uses a reference numeral to refer to FIG. 1, that portion of the description applies equally to elements designated by primed numerals in FIG. 5 and double-primed numerals in FIGS. 6-8.

Figure 1:
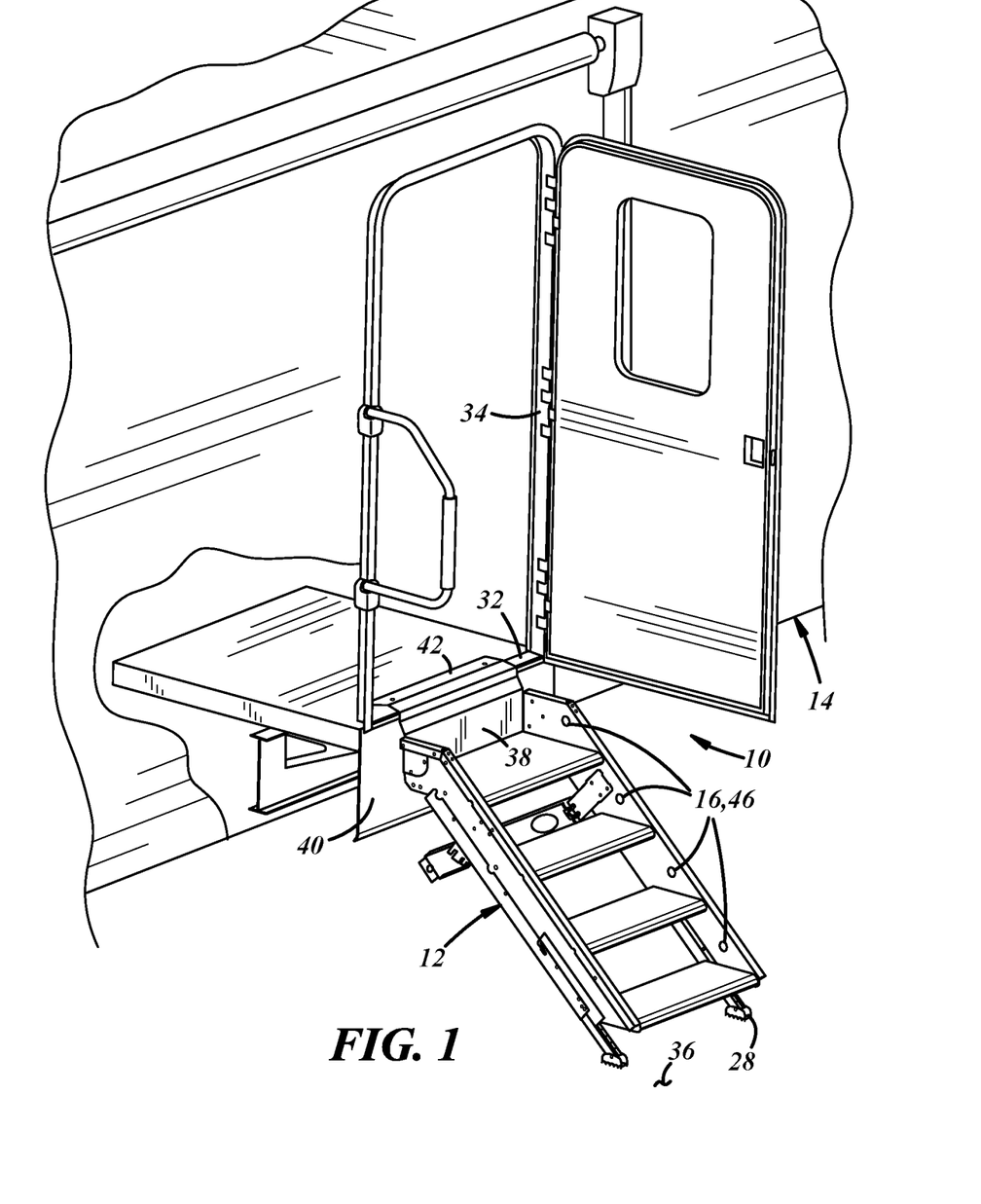
FIG. 1 is a partial perspective view of an RV and a deployable RV stairway carried by the RV in a deployed position extending downward and outward from an attachment point in a doorway of the RV.
Figure 2:
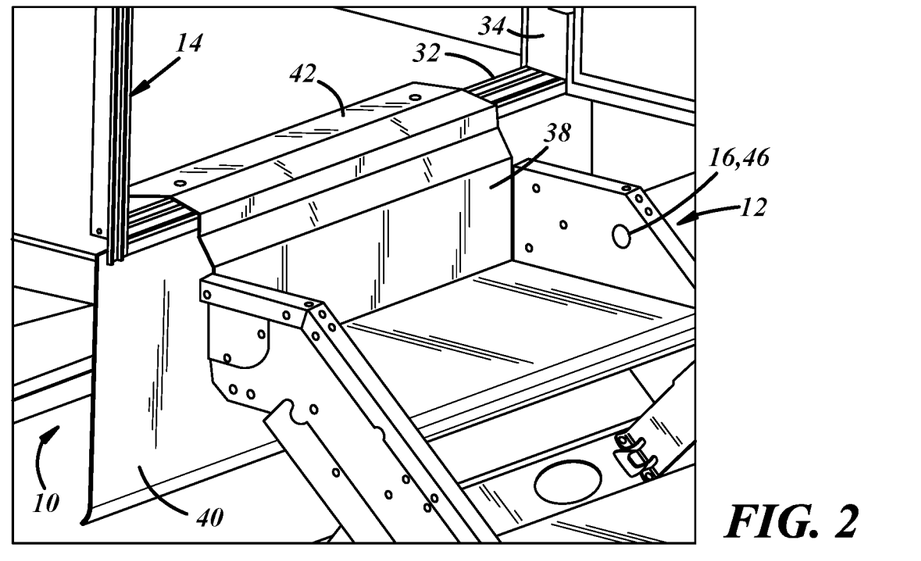
FIG. 2 is a magnified view of the attachment point of the RV stairway to the RV of FIG. 1.

The apparatus 10 may include a deployable structure 12 supported on a supporting structure 14 for motion between a stowed position (shown in FIG. 9) and a deployed position (shown in FIGS. 1-8), and may also include an electrically-powered device 16 carried by the deployable structure 12 (shown in FIGS. 1 and 2). As best shown in FIG. 10, the apparatus 10 may further include a wireless electrical power receiving circuit (generally shown at 18) that may be carried by the deployable structure 12 and connected between the device 16 and a wireless electrical power receiver 20 that is also carried by the deployable structure 12. A wireless electrical power transmitting circuit (generally shown at 22) may be carried by the supporting structure 14 and connected between an electrical power supply 24, such as a 12V travel trailer battery, and a wireless electrical power transmitter 26 that is also carried by the supporting structure 14. As shown in FIGS. 1-9, the wireless electrical power transmitter 26 may be carried by the supporting structure 14 and the wireless electrical power receiver 20 may be carried by the deployable structure 12 in respective positions where wireless electrical power transfer between the wireless electrical power transmitter 26 and receiver 20 will power the device 16 via the receiving circuit 18 when the deployable structure 12 is in its deployed position, and may not power the device 16 when the deployable structure 12 is in the stowed position.

Figure 9:
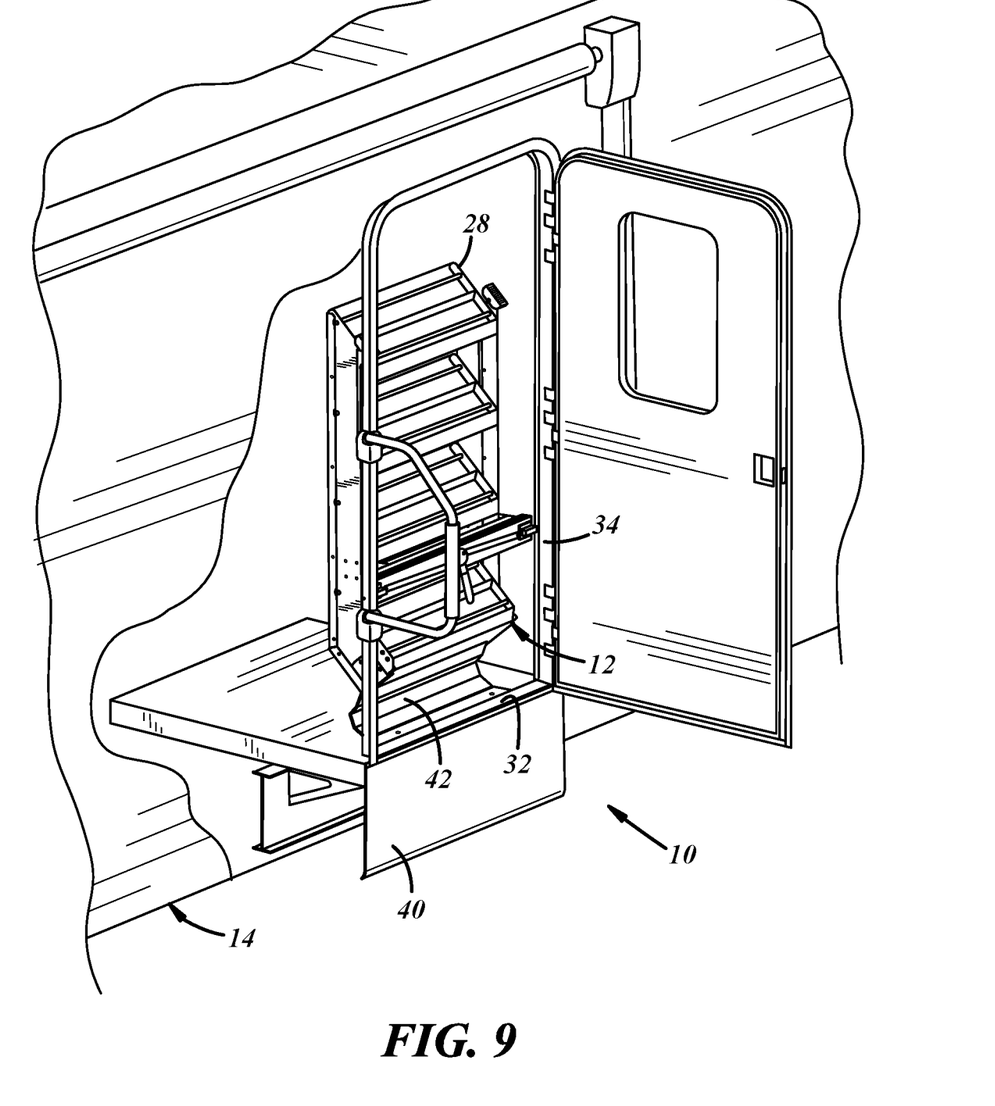
FIG. 9 is a partial perspective view of the RV and a deployable RV stairway of FIG. 1 showing the stairway carried by the RV in a generally vertical stowed position in a doorway of the RV.
Figure 10:
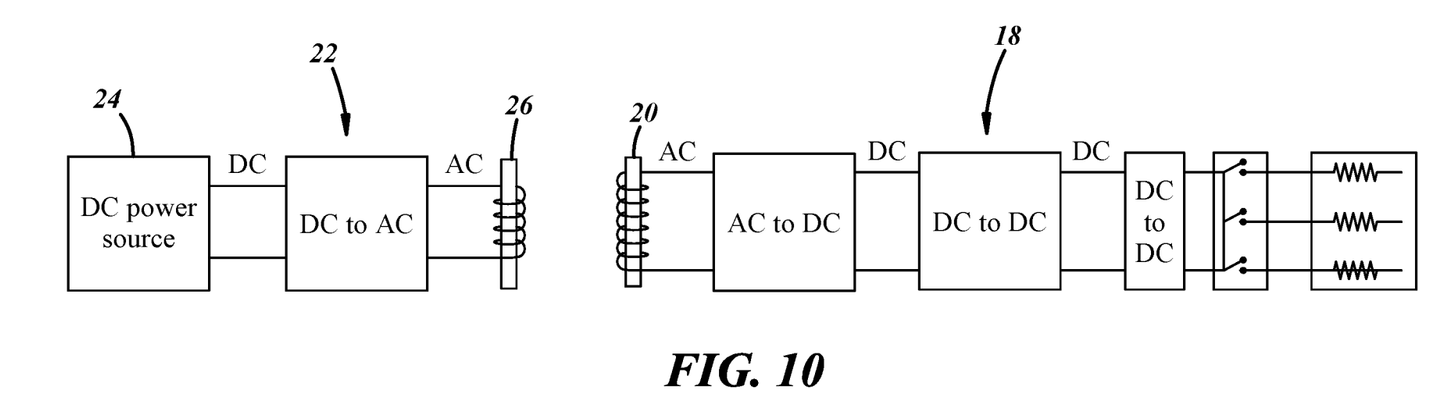
FIG. 10 is a schematic diagram showing a transmitter circuit of the wireless power transmitter of FIGS. 1-9 and a receiver circuit of the wireless power receiver of FIGS. 1-9.

As shown in FIGS. 1 and 9, in the deployed position, a distal or outer end 28 of the deployable structure 12 may be farther from the supporting structure 14 than it is when the deployable structure 12 is in the stowed position. In the stowed position, the distal or outer end 28 of the deployable structure 12 may be closer to the supporting structure 14 than it is when the deployable structure 12 is in the deployed position.

Also, in the deployed position the deployable structure 12 may be disposed in a position unsecured for travel, i.e., unsecured against motion relative to the supporting structure 14 while the structure 14 is in motion. In the stowed position the deployable structure 12 may be disposed in a position secured for travel, i.e., secured against motion relative to the supporting structure 14 while the vehicle is in transit, as shown in FIG. 9. The deployable structure 12 may be supported on the supporting structure 14 for pivotal motion between the stowed position and the deployed position about a pivot axis 30, best shown in FIGS. 4-6.

As best shown in FIGS. 1 and 9, the supporting structure 14 may comprise a recreational vehicle (RV), and the deployable structure 12 may comprise an RV stairway supported on the RV 14 for pivotal motion about a stairway pivot axis 30 adjacent a doorsill 32 of an RV doorway 34. The pivotal motion of the RV stairway 12 may be between a generally vertical stowed position in the RV doorway 34, as shown in FIG. 9, and a deployed position extending diagonally downward and outward from the stairway pivot axis 30 to a generally horizontal surface 36 such as the ground, as best shown in FIG. 1.

Figure 3:
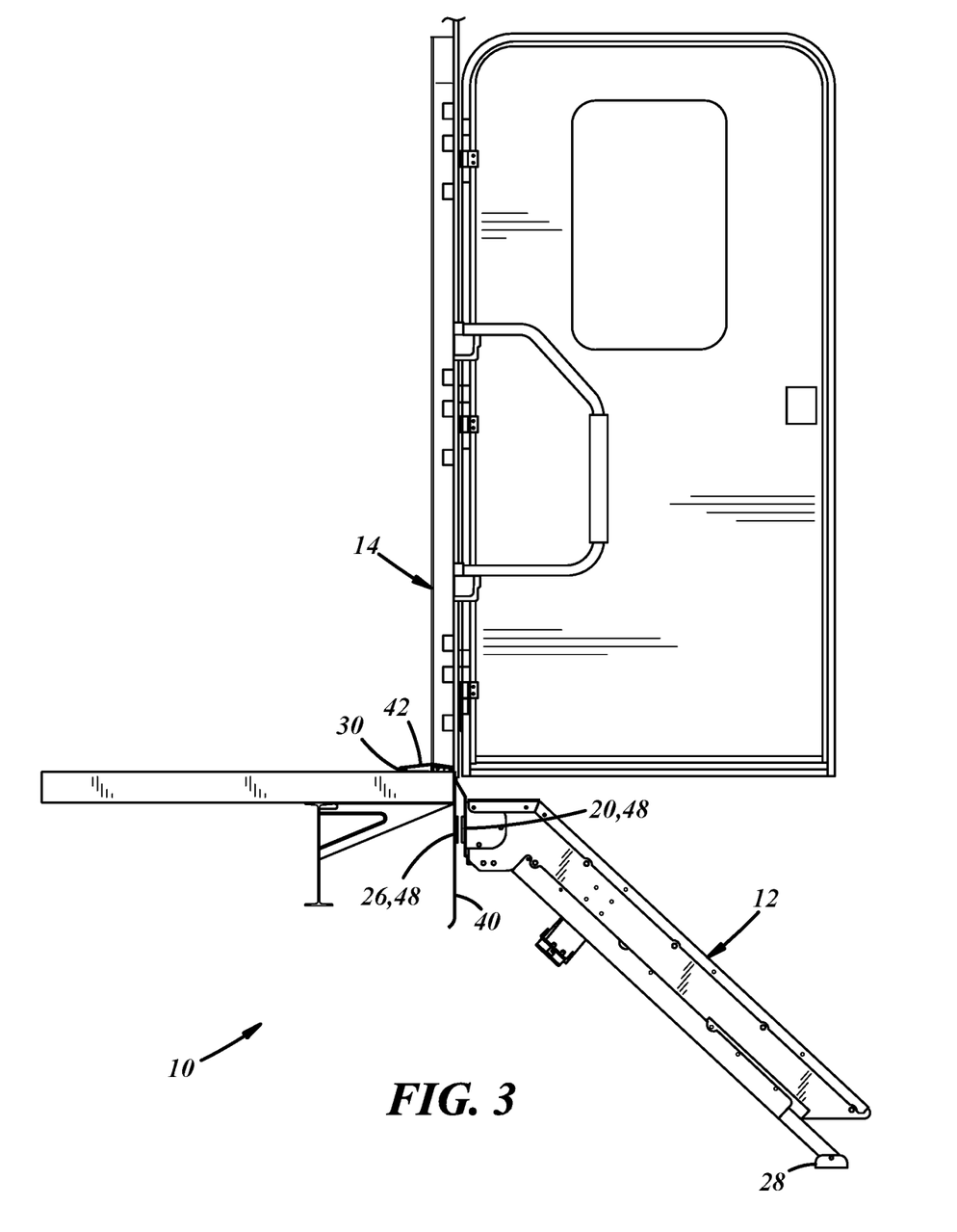
FIG. 3 is a partial cross-sectional side view of the RV and deployable RV stairway of FIG. 1.
Figure 4:
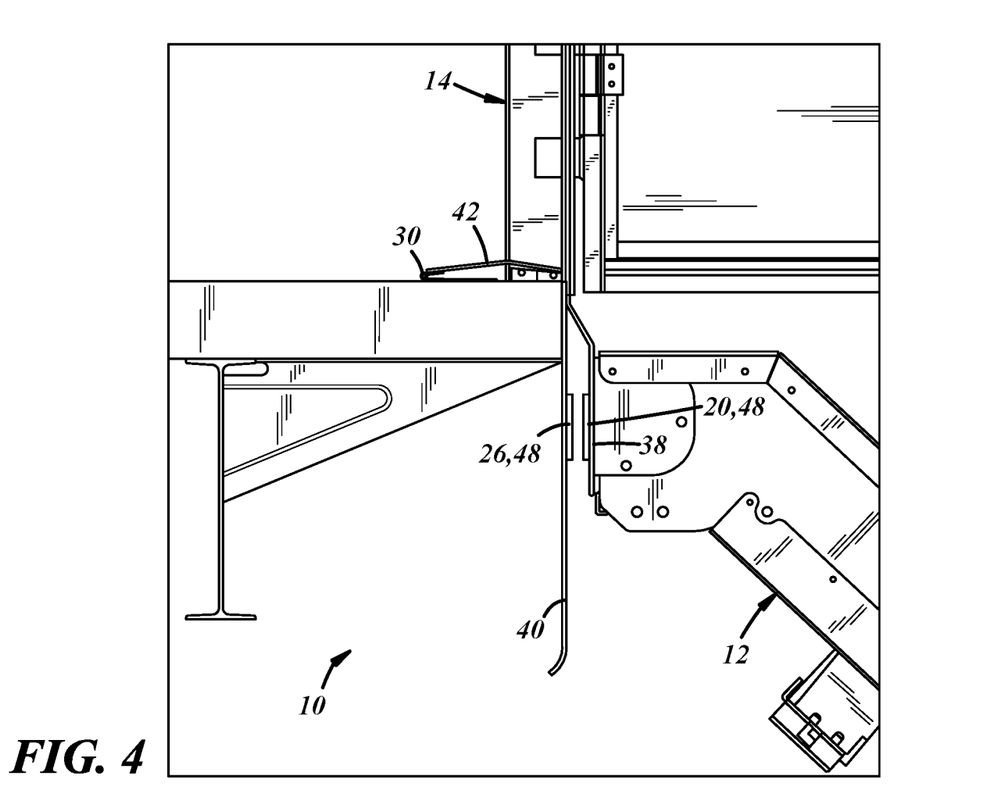
FIG. 4 is a magnified view of the RV and deployable RV stairway of FIG. 3, showing a wireless power transmitter carried on an outboard surface of perimeter skirting of the RV and showing a wireless power receiver carried on a back side of a top step riser plate of the RV stairway.

As shown in FIGS. 3-4, the wireless electrical power receiver 20 may be carried by a top step riser plate 38 of an RV stairway 12. As is also shown in FIGS. 3-4, the wireless electrical power receiver 20 may be disposed adjacent, and fastened by any suitable means to, a back side of the top step riser plate 38. As shown in FIGS. 3 and 4, the wireless electrical power transmitter 26 may be disposed adjacent and fastened by any suitable means to an outboard surface of perimeter skirting 40 of the RV 14. Thus, the wireless electrical power transmitter 26 and receiver 20 are disposed facing one another between the RV skirting 40 and the RV stairway riser plate 38.

Figure 5:
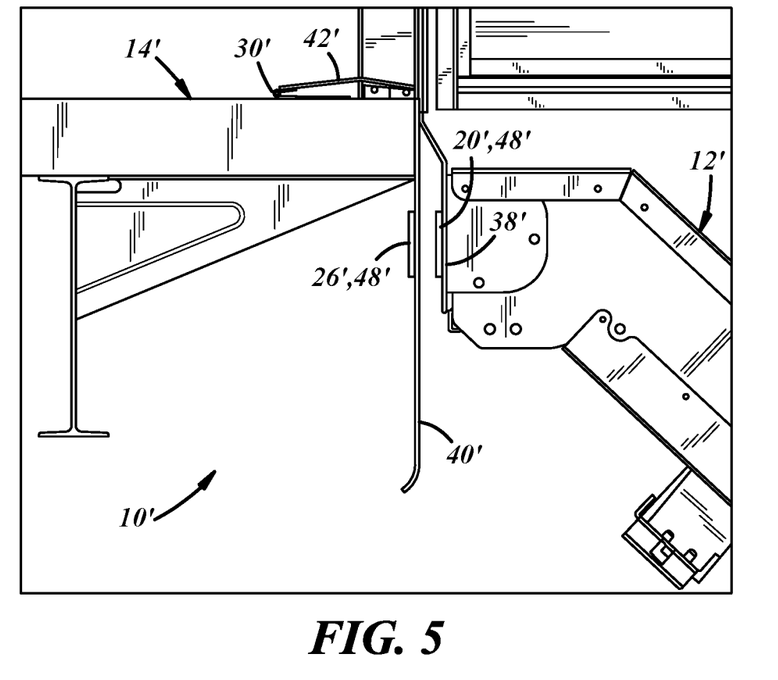
FIG. 5 is a magnified partial view of the RV of FIG. 1 and an alternative deployable RV stairway embodiment in which a wireless power transmitter is carried on an inboard surface of perimeter skirting of the RV and a wireless power receiver is carried on a back side of a top step riser plate of the RV stairway.

Alternatively, and according to the second embodiment 10' of the apparatus shown in FIG. 5, the wireless electrical power transmitter 26' may be disposed adjacent, and fastened by any suitable means to, an inboard surface of the perimeter skirting 40' of the RV 14'. The wireless electrical power transmitter 26' would thus be positioned opposite the wireless electrical power receiver 20' relative to the RV perimeter skirting 40', and the perimeter skirting 40' would comprise a material such as fiberglass having an electromagnetic permeability characteristic sufficient to allow wireless transfer of electrical power from the wireless electrical power transmitter 26' to the wireless electrical power receiver 20'.

In other embodiments the wireless electrical power transmitter 26 may be positioned on either side of the RV perimeter skirting 40, and the wireless electrical power receiver 20 may be positioned on either side of the top step riser plate 38 of the RV stairway 12. RV perimeter skirting material and RV top step riser plate material may be selected to ensure sufficient electromagnetic permeability when disposed between the wireless electrical power transmitter 26 and receiver 20.

Figure 6:
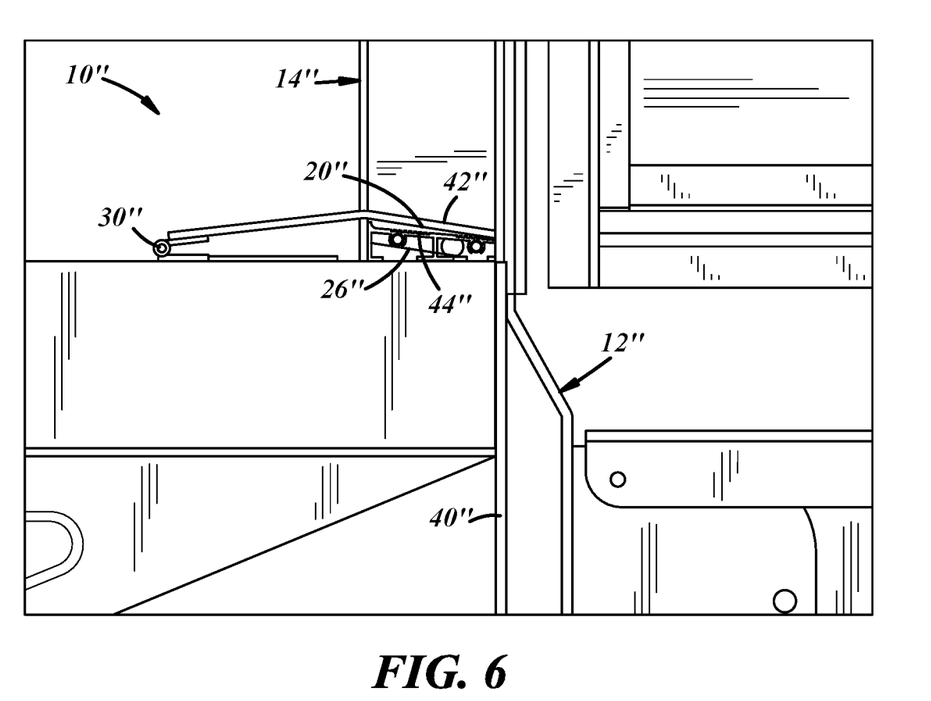
FIG. 6 is a partial cross-sectional view of the RV of FIG. 1 and an alternative deployable RV stairway embodiment in which a wireless power transmitter is carried in a threshold channel of an RV doorway, and a wireless power receiver is carried on the underside of an RV stairway threshold plate.
Figure 7:
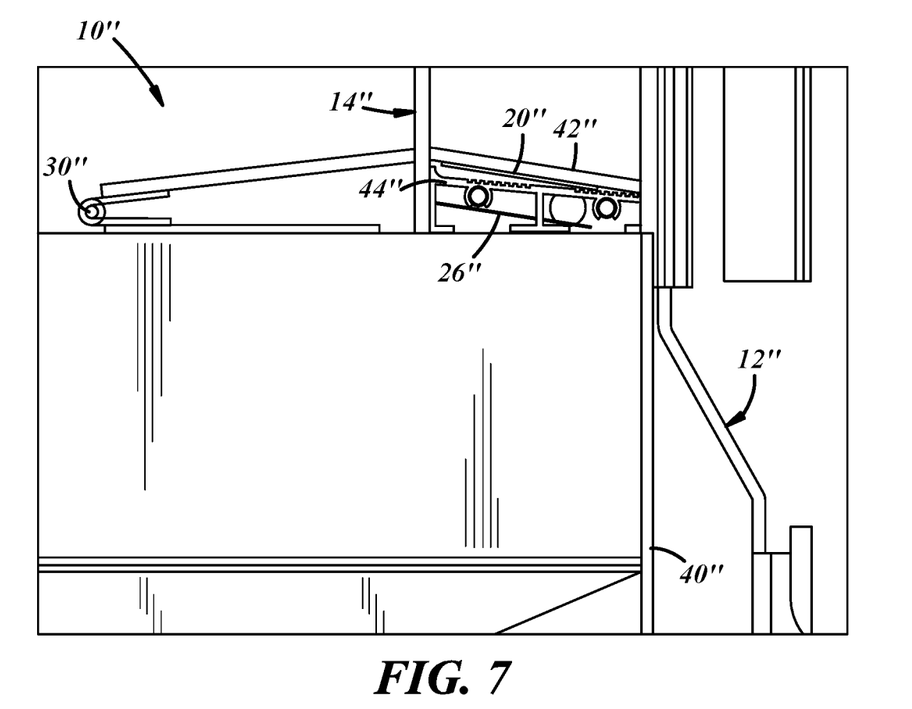
FIG. 7 is a magnified partial view of the RV and deployable RV stairway, the wireless power transmitter, RV threshold channel, wireless power receiver, and RV stairway threshold plate of FIG. 6.
Figure 8:
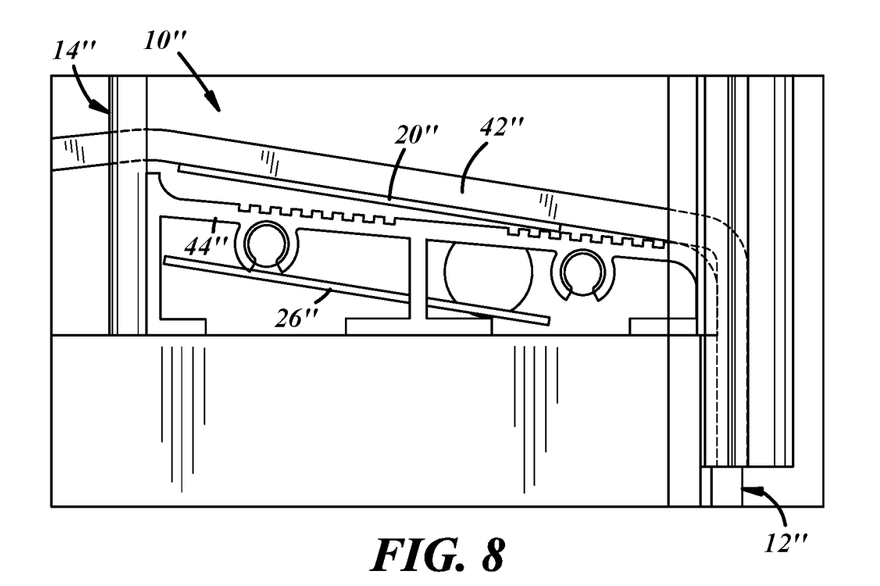
FIG. 8 is a magnified partial view of the RV and deployable RV stairway, the wireless power transmitter, RV threshold channel, wireless power receiver, and RV stairway threshold plate of FIG. 7.

As a further alternative, and according to the third embodiment 10" of the apparatus shown in FIGS. 6-8, the wireless electrical power receiver 20" may be disposed on, and secured by any suitable means to, a back or under side of a threshold plate 42" of the RV stairway 12"; and the wireless electrical power transmitter 26" may be disposed inside, and may be secured by any suitable means to, a threshold channel 44" carried by the RV 14" in the RV doorway 34". Alternatively, the wireless electrical power transmitter 26" may be positioned on either side of the threshold channel 44", and the wireless electrical power receiver 20" may be positioned on either side of the RV stairway threshold plate 42".

The wireless electrical power transmitter 26 and receiver 20 may be disposed in any other respective suitable locations where power can be transferred wirelessly between the wireless electrical power transmitter 26 and receiver 20 when the deployable structure 12 is in its deployed position.

As shown in FIGS. 1 and 2, the electrically-powered device 16 may comprise one or more electric lights or lamps 46. Where the electrically-powered device 16 comprises more than one light 46, the lights 46 may be electrically connected to one another in a light string, and the light string may be connected to the wireless electrical power receiver 20 by the wireless electrical power receiving circuit 18.

As shown in FIG. 10, the wireless electrical power receiver 20 may be an inductive electrical power receiver, and the wireless electrical power transmitter 26 may be an inductive electrical power transmitter. In embodiments where the wireless electrical power transmitter 26 and receiver 20 are an inductive transmitter and receiver, they may be of any suitable commercially-available type.

As shown in FIGS. 3-5, the wireless electrical power receiver 20 and transmitter 26 may be housed in respective thin-walled plastic enclosures 48 configured to accommodate mounting to a surface.

A wirelessly electrically-coupled deployable apparatus constructed according to the above embodiments overcomes disadvantages associated with the use of wires to transfer electrical power to deployable structures from supporting structures where electrically-powered devices carried by the deployable structures are to be powered when deployed and may not be powered when stowed.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A wirelessly electrically-coupled deployable apparatus comprising:
   a deployable structure supported on a supporting structure for motion between a stowed position and a deployed position;
   an electrically-powered device carried by the deployable structure;
   a wireless electrical power receiving circuit carried by the deployable structure and connected between the device and a wireless electrical power receiver;
   a wireless electrical power transmitting circuit carried by the supporting structure and connected between an electrical power supply and a wireless electrical power transmitter; and
   the wireless electrical power transmitter being carried by the supporting structure and the wireless electrical power receiver being carried by the deployable structure in respective positions where wireless electrical power transfer between the wireless electrical power transmitter and receiver powers the device via the receiving circuit when the deployable structure is in its deployed position.

2. A wirelessly-coupled deployable apparatus as defined in claim 1 in which the deployable structure is supported on the supporting structure for pivotal motion between the stowed position and the deployed position about a pivot axis.

3. A wirelessly-coupled deployable apparatus as defined in claim 1 in which:
   the supporting structure comprises a recreational vehicle (RV); and
   the deployable structure comprises an RV stairway supported on the RV for pivotal motion about a stairway pivot axis adjacent a doorsill of an RV doorway, between a generally vertical stowed position in the RV doorway, and a deployed position extending diagonally downward and outward from the stairway pivot axis to a generally horizontal surface such as the ground.

4. A wirelessly-coupled deployable apparatus as defined in claim 3 in which the receiver is carried by a top step riser plate of the RV stairway.

5. A wirelessly-coupled deployable apparatus as defined in claim 4 in which the receiver is disposed adjacent a back side of the top step riser plate.

6. A wirelessly-coupled deployable apparatus as defined in claim 4 in which the transmitter is disposed adjacent an inboard surface of perimeter skirting of the RV.

7. A wirelessly-coupled deployable apparatus as defined in claim 4 in which the transmitter is disposed adjacent an outboard surface of perimeter skirting of the RV.

8. A wirelessly-coupled deployable apparatus as defined in claim 3 in which:
   the receiver is disposed on a back side of a threshold plate of the RV stairway; and
   the transmitter is disposed inside a threshold channel carried by the RV in the RV doorway.

9. A wirelessly-coupled deployable apparatus as defined in claim 1 in which the electrically-powered device comprises a light.

10. A wirelessly-coupled deployable apparatus as defined in claim 1 in which:
    the wireless electrical power receiver is an inductive electrical power receiver; and
    the wireless electrical power transmitter is an inductive electrical power transmitter.

11. A wirelessly-coupled deployable apparatus as defined in claim 10 in which the wireless electrical power receiver and transmitter are housed in respective enclosures configured for mounting to a surface.

* * * * *